United States Patent [19]

Inoue et al.

[11] Patent Number: 5,701,862
[45] Date of Patent: Dec. 30, 1997

[54] METHOD AND APPARATUS FOR REPLENISHING THE LUBRICATING OIL OF AN INTERNAL COMBUSTION ENGINE

[75] Inventors: Kiyoshi Inoue; Masakuni Hirata, both of Kanagawa-ken, Japan

[73] Assignee: Nippon Oil Company Limited, Japan

[21] Appl. No.: 442,098

[22] Filed: May 16, 1995

[30] Foreign Application Priority Data

May 26, 1994 [JP] Japan .................. 6-112977

[51] Int. Cl.⁶ ............................... F01M 11/06
[52] U.S. Cl. .............. 123/196 S; 137/391; 184/1.5
[58] Field of Search ............ 123/196 S, 73 AD; 184/1.5; 137/391

[56] References Cited

U.S. PATENT DOCUMENTS

| | | | |
|---|---|---|---|
| 4,603,666 | 8/1986 | Martinelli | 123/196 S |
| 4,750,456 | 6/1988 | Ladrach | 123/196 S |
| 4,869,346 | 9/1989 | Nelson . | |
| 4,966,105 | 10/1990 | Mori | 123/73 AD |
| 4,989,560 | 2/1991 | Rasdal et al. | 123/196 S |
| 5,056,622 | 10/1991 | Vermeulen | 123/196 S |
| 5,092,429 | 3/1992 | Linares | 123/196 S |
| 5,159,313 | 10/1992 | Kawai et al. | 123/196 S |
| 5,238,085 | 8/1993 | Engelmann | 184/1.5 |
| 5,273,134 | 12/1993 | Hegemeier | 123/196 S |
| 5,390,762 | 2/1995 | Nelson | 123/196 S |
| 5,431,138 | 7/1995 | Hurner | 123/196 S |

FOREIGN PATENT DOCUMENTS

| | | | |
|---|---|---|---|
| 30 19 877 | 11/1980 | Germany . | |
| 39 06 759 | 6/1990 | Germany . | |
| 4204502 | 8/1993 | Germany | 123/196 S |
| 5-163922 | 6/1993 | Japan . | |

*Primary Examiner*—Erick R. Solis
*Attorney, Agent, or Firm*—Finnegan, Henderson, Farabow, Garrett & Dunner, L.L.P.

[57] ABSTRACT

A method and apparatus for replenishing the lubricating oil of an internal combustion engine involving, during operation of the engine, continuously supplying a predetermined quantity of new oil from a reserve tank in which lubricating oil is stored to a holding region for lubricating oil circulated to the engine. As a result, an adequate effective extension of the life of the lubricating oil can be achieved, so that maintenance of the engine lubricating oil can be greatly reduced.

9 Claims, 3 Drawing Sheets

METHOD AND APPARATUS FOR REPLENISHING THE LUBRICATING OIL OF AN INTERNAL COMBUSTION ENGINE

BACKGROUND OF THE INVENTION

1. Field of the Invention

The present invention relates to a method and apparatus for replenishing, from a reserve tank in which lubricating oil is stored, the lubricating oil in a holding region for lubricating oil circulated to the engine. In particular the present invention relates to technology for making lubricating oil replenishment maintenance free.

2. Description of the Related Art

With an internal combustion engine used in a vehicle (referred to hereunder as an engine) an oil pan is provided beneath the engine cylinder block, and lubricating oil (engine oil) held in the oil pan is circulated to the various parts of the engine to lubricate these parts.

Due to degradation of the engine oil with time, the oil must be changed after a certain period.

The oil change period, according for example to the vehicle makers owner's manual, is at the most every 15,000 km for gasoline engines, even if a top grade engine oil such as APISH grade (American peroleum Institute-SH grade) is used.

The vehicle owner must therefore pay attention to the distance travelled or the running time of the vehicle, and change the engine oil periodically.

Similarly with stationary type gasoline engines or diesel engines, the engine oil must be changed periodically, and in replenishing the engine oil a large amount of time and labour is required, which is a major cause of increased running costs.

Therefore, various attempts as listed below under (1)–(4), have heretofore been made to reduce oil maintenance by making the engine oil change period as long as possible:

(1) Increasing the capacity of the oil pan to increase the oil storage volume.

(2) Periodically checking the quantity of oil stored in the oil pan, and replenishing the oil consumed portion from a reserve tank in which lubricating oil is stored.

(3) Replenishing the oil consumed portion from a reserve tank in which lubricating oil is stored, and removing insoluble matter in the oil using a filter.

(4) At fixed periods, forcibly removing oil from an oil pan in which high and low levels have been set, down to the low level, and forcibly replenishing to the high level with new oil from a reserve tank (refer to Japanese Unexamined Patent Publication No. 5-163922).

With, above methods and apparatus aimed at reducing oil maintenance however there are the following respective problems.

With (1), there is still the same requirement to periodically change the engine oil, so that there is no real benefit.

With (2), the life of the oil cannot be extended by merely replenishing the oil consumed portion.

With (3), also the life of the oil cannot be extended by merely replenishing the oil consumed portion. Moreover since degraded matter and precursors thereto are not necessarily insoluble in the oil, then even with a filter these cannot be removed. Hence the method cannot be considered effective for extending the life of the oil.

With (4), since the removal and replenishment of oil at fixed periods is carried out by level management and involves changing the oil, the oil life can be extended compared to the case where only the oil consumed portion is replenished. However since a large quantity of oil is changed at one time, and the oil replenishment quantity is not closely controlled, there is wastage of large quantities of oil wherein the additives in the oil are still able to function adequately. Moreover a large quantity of oil is changed, so that comparatively speaking it is hard to say that this effectively extends the live of the oil. Furthermore, engine oil wastage is great.

SUMMARY OF THE INVENTION

In view of the above problems with the conventional methods, it is an object of the present invention to provide a method of replenishing the lubricating oil of an internal combustion engine so that an adequate effective extension of the life of the lubricating oil can be achieved, enabling lubricating oil replenishment to be more effectively maintenance free.

It is a further object of the present invention to provide an apparatus which can carry out the method of replenishing the lubricating oil, with a simple construction and operation.

To achieve the above objects, the present invention provides a method of replenishing the lubricating oil of an internal combustion engine involving, during operation of the engine, continuously supplying a predetermined quantity of new oil from a reserve tank in which lubricating oil is stored to a holding region for lubricating oil circulated to the engine.

Since during operation of the engine, a predetermined quantity of new oil is continuously supplied from the reserve tank to the lubricating oil holding region, an adequate effective extension of the life of the lubricating oil can be achieved, so that maintenance of the engine lubricating oil can be greatly reduced, and particularly with stationary type gasoline engines or diesel engines, the large amount of time and labour required in lubricating oil replenishment can be reduced, enabling a reduction in running costs.

Preferably, the method of replenishing the lubricating oil of an internal combustion engine may additionally include, checking the level of the lubricating oil in the lubricating oil holding region at fixed periods, and supplying or removing lubricating oil to bring the lubricating oil level to a management level.

The lubricating oil in the lubricating oil holding region is consumed by evaporation and combustion. Therefore, to keep the oil level therein at the predetermined management level, the quantity of lubricating oil in the lubricating oil holding region, is monitored at fixed periods, for example at each fixed total engine operating time, and lubricating oil is supplied or removed to bring the lubricating oil level to the management level.

More specifically, by monitoring the quantity of lubricating oil in the lubricating oil holding region, then when the quantity is less than for the management level, a sufficient quantity of lubricating oil to achieve the management level is supplied from the reserve tank to the lubricating oil holding region. Alternatively, when the quantity is greater than for the management level, then a necessary quantity of lubricating oil is removed from the lubricating oil holding region.

Moreover, preferably, the method of replenishing lubricating oil of an internal combustion engine may additionally include, supplying or removing lubricating oil to bring the lubricating oil level to the management level, at times when the lubricating oil level in the lubricating oil holding region falls below a previously determined lower limit level or rises above a previously determined upper limit level.

As a result, when the lubricating oil level in the lubricating oil holding region falls below the previously determined lower limit level or rises above the previously determined upper limit level, then a quantity of lubricating oil sufficient to achieve the management level is supplied from the reserve tank to the lubricating oil holding region, or removed from the lubricating oil holding region, to bring the lubricating oil level to the management level.

Moreover, the abovementioned predetermined quantity of new oil may be a quantity previously determined to correspond to the engine operating conditions.

In this case, the quantity of lubricating oil supplied to the lubricating oil holding region may be controlled to a quantity corresponding to the engine operating conditions, so that the extension of the life of the lubricating oil can be more effectively achieved.

Furthermore, to achieve the above objects, the present invention provides an apparatus for replenishing the lubricating oil of an internal combustion engine, comprising a reserve tank, a lubricating oil supply device, and a control device, the reserve tank being a tank for storing lubricating oil, the lubricating oil supply device being a device for supplying a predetermined quantity of lubricating oil from the reserve tank to a holding region for lubricating oil circulated to the engine, and the control device being a device for controlling, during operation of the engine, the lubricating oil supply device so that a predetermined quantity of new oil is continuously supplied from the reserve tank to the lubricating oil holding region.

Since, during operation of the engine, a predetermined quantity of new oil is continuously supplied from the reserve tank to the lubricating oil holding region by means of the lubricating oil supply device controlled by the control device, an adequate effective extension of the life of the lubricating oil can be achieved, so that maintenance of the engine lubricating oil can be greatly reduced, and in particular, with stationary type gasoline engines or diesel engines, the large amount of time and labour required in lubricating oil replenishment can be reduced enabling a reduction in running costs.

Preferably, the apparatus for replenishing the lubricating oil of an internal combustion engine may additionally include, a lubricating oil removal device for removing lubricating oil from the lubricating oil holding region, and an oil quantity detection device for detecting the quantity of oil in the lubricating oil holding region, and
the control device may act as a device for controlling, during operation of the engine, the lubricating oil supply device and the lubricating oil removal device, based on a detection signal output at fixed periods from the oil quantity detection device.

The lubricating oil in the lubricating oil holding region is consumed by evaporation and combustion. Therefore, to keep the oil therein at the predetermined management level, the quantity of lubricating oil in the lubricating oil holding region, is monitored by the oil quantity detection device, at fixed periods, for example at each fixed total engine operating time, and lubricating oil is supplied or removed by the control of the lubricating oil supply device and the lubricating oil removal device to bring the lubricating oil level to the management level. More specifically, by monitoring the quantity of lubricating oil in the lubricating oil holding region, then when the quantity is less than for the management level, a sufficient quantity of lubricating oil to achieve the management level is supplied from the reserve tank to the lubricating oil holding region. Alternatively, when the quantity is greater than for the management level, then the necessary quantity of lubricating oil is removed from the lubricating oil holding region.

Moreover, it is preferable that the apparatus for replenishing the lubricating oil of an internal combustion engine may additionally include, an engine operating conditions detection device for detecting the engine operating conditions, and the control device may act as a device for controlling the quantity of lubricating oil supplied to the lubricating oil holding region, to a quantity corresponding to the engine operating conditions, based on a detection signal output from the engine operating conditions detection device.

As a result, since the quantity of lubricating oil supplied to the lubricating oil holding region is controlled to a quantity corresponding the engine operating conditions, the extension of the life of the lubricating oil can be more effectively achieved.

The present invention will now be described in detail based on an embodiment shown in the drawings. While the present invention may be better understood from the following embodiment, it is not to be limited by such, and may be modified freely within the scope of the claims.

DETAILED DESCRIPTION OF A PREFERRED EMBODIMENT

Figure 1:
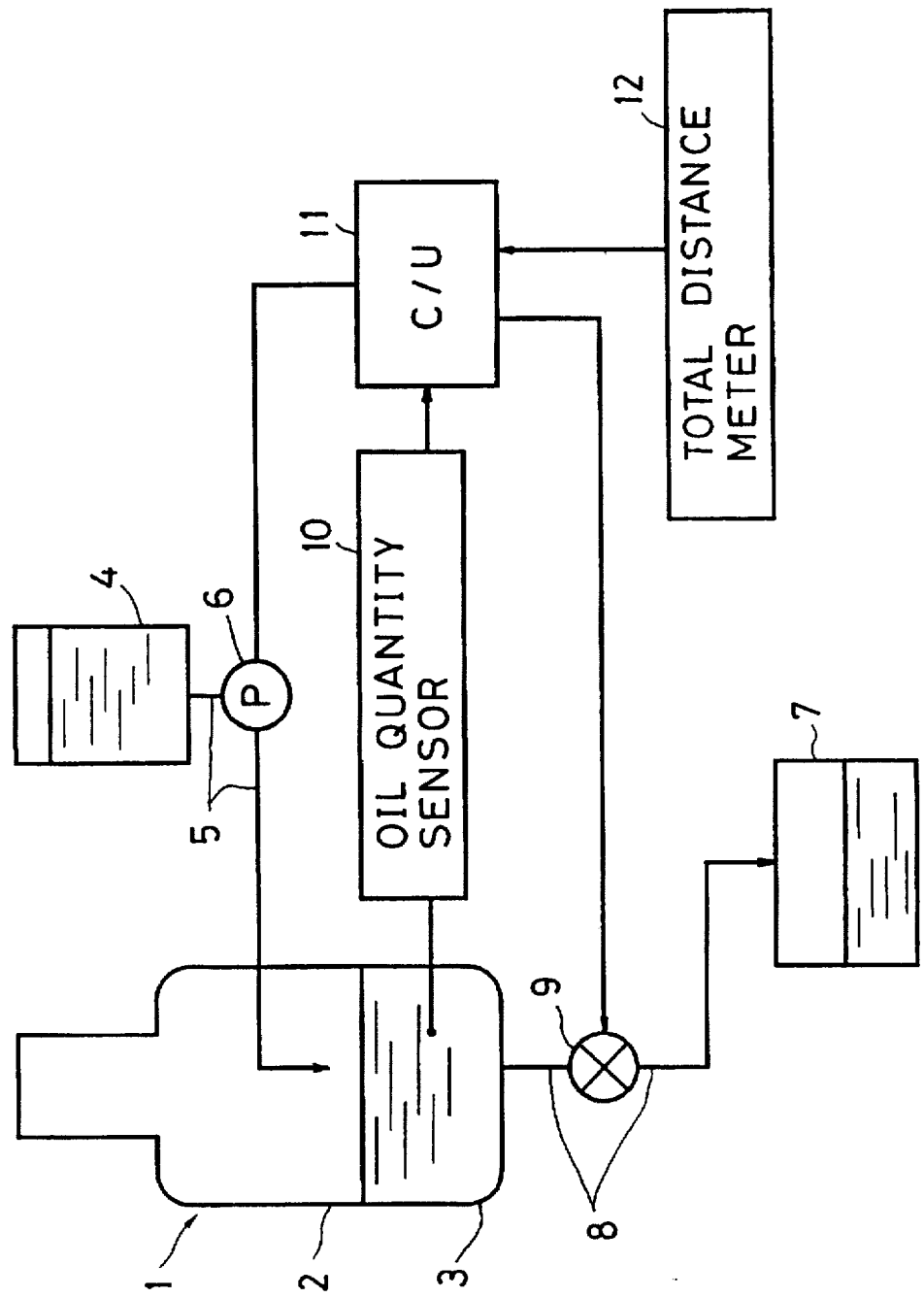
FIG. 1 is a schematic diagram of an embodiment of the present invention.

FIG. 1 is a schematic diagram of the structure of an embodiment of a lubricating oil supply apparatus according to the present invention, for carrying out a lubricating oil supply method of the invention.

In FIG. 1, an engine 1 has an oil pan 3, which acts as a holding region for lubricating oil circulated to the engine 1, provided beneath a cylinder block 2 of the engine 1. The lubricating oil (engine oil) held in the oil pan 3 is circulated to the various parts of the engine to lubricate these parts.

A reserve tank 4 in which engine oil is stored, is provided together with a lubricating oil supply device for supplying a predetermined quantity of lubricating oil from the reserve tank 4 to the oil pan 3. The lubricating oil supply device comprises oil supply piping 5 which connects between a bottom portion of the reserve tank 4 and the interior of the oil pan 3, and a quantitative pump 6 located in the supply piping 5.

Also provided is a discharge oil tank 7 for temporarily storing oil removed from the oil pan 3, and a lubricating oil removal device for removing oil from the oil pan 3 to the discharge oil tank 7. The lubricating oil removal device comprises oil discharge piping 8 which connects between a bottom portion of the oil pan 3 and the interior of the discharge oil tank 7, and a solenoid valve 9 located in the oil discharge piping 8.

An oil quantity sensor 10 (as an oil quantity detection device) is provided in the oil pan 3, for detecting the quantity of oil in the oil pan 3.

A control device is provided for controlling, during operation of the engine, the quantity pump 6 and the solenoid valve 9, based on a detection signal output at fixed periods from the oil quantity sensor 10, so that a predetermined quantity of new oil is continuously supplied from the reserve tank 4 to the oil pan 3.

In this case, the function of the control device is realized by software stored in a control unit 11. The detection signal output from the oil quantity sensor 10 is input to the control unit 11, and respective control signals are output therefrom to the quantitave pump 6 and the solenoid valve 9.

The oil level in the oil pan 3 is checked at fixed periods for controlling the quantitative pump 6 and the solenoid valve 9, determination of whether or not it is time for the oil level check, being based on the total engine operating time or the total travelling distance.

Therefore the construction is such that a timer for measuring the total running time of the engine is realized by software in the control unit 11, or a total travelling distance meter 12 is provided for detecting the total travelling distance, and signals output from the total travelling destance meter 12 are input to the control unit 11.

A replenishment method for replenishment using a lubricating oil supply apparatus of such a construction will now be described.

The replenishment method involves, during operation of the engine, continuously supplying a predetermined quantity of new oil from the reserve tank 4 to the oil pan 3, and checking the oil level in the oil pan 3 at fixed periods, and supplying or removing oil to bring the oil level to the management level.

In this respect, a predetermined quantity of new oil, more specifically a quantity V1 per time t, is continuously supplied from the reserve tank 4. While the supply quantity differs depending on the engine horse power, it is set in a range from 1 ml~1000 ml to give from 0.1~2.0 g/PS·h.

A quantity V2 of the oil in the oil pan 3 is consumed due to evaporation and combustion. Therefore, to keep the oil in the oil pan 3 at a predetermined management level L, the quantity of oil in the oil pan 3 is monitored by the oil quantity sensor 10 at fixed periods, for example at each fixed total engine operating time T or at each fixed total vehicle travelling distance, and oil is supplied or removed to bring the oil level to the management level. It is preferable that the fixed total engine operating time T may be for example from 20–200 hours. By monitoring the oil quantity in the oil pan 3, then when the oil quantity is less than for the management level (case 1), a quantity V3 of oil to achieve the management level is supplied from the reserve tank 4 to the oil pan 3. Alternatively, when the oil quantity is greater than for the management level (case 2), then a necessary quantity V4 of oil is removed from the oil pan 3 to the discharge oil tank 7.

Accordingly, the total replenishment quantity V of new oil for after a fixed period, for example after a fixed total engine operating time T, or after a fixed total vehicle travelling distance, can be expressed by the following equation:

$$V = \Sigma(V1 - V2 + V3) \quad \text{Case 1}$$

$$V = \Sigma(V1 - V2 - V4) \quad \text{Case 2}$$

Figure 2:
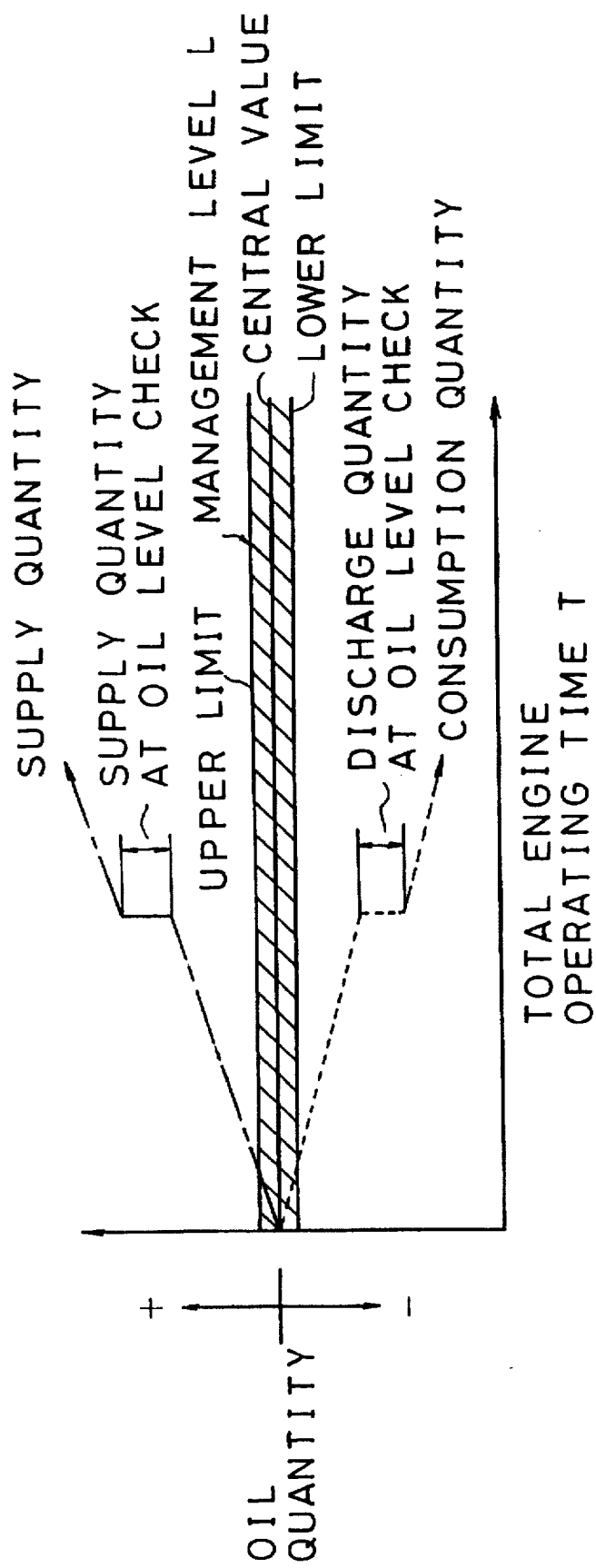
FIG. 2 is a time chart for explaining the details of an oil replenishment control of the embodiment.

Details of the above control method are shown by the time chart of FIG. 2. In FIG. 2, the dashed line shows the progress of the oil supply quantity, while the dotted line shows the progress of the oil consumption quantity. Moreover, the management level L is set to have a predetermined permissible range as shown by the diagonal hatching, determined by upper and lower limit values relative to a central value.

Figure 3:
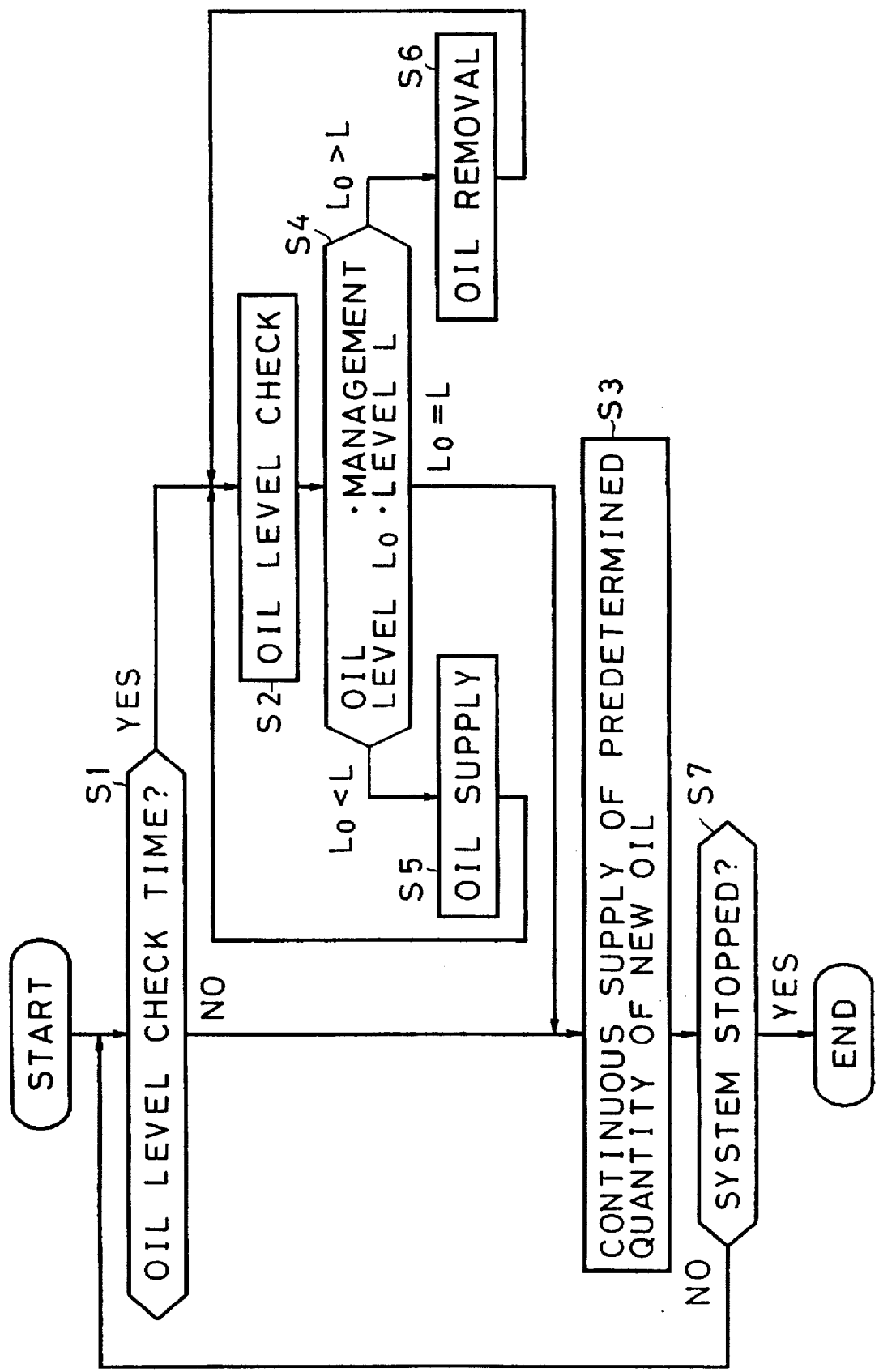
FIG. 3 is a flow chart for explaining the details of the oil replenishment control of the embodiment.

The details of the oil replenishment control method using the control unit 11 will now be described with reference to the flow chart of FIG. 3.

In step 1 (with "step" denoted by S in the figures), it is judged if the check time for the oil level inside the oil pan 3 has been reached, based on a signal output from a timer for measuring the total operating time of the engine, or output from a total travelling distance meter 12 for detecting the total travelling distance of the vehicle.

When judged that the oil level check time has been reached, control proceeds to step 2, while when judged that the check time has not been reached, control proceeds to step 3. In step 2, the oil level check is carried out, and control proceeds to step 4 where an oil level Lo is compared with a management level L having a predetermined permissible range as described above. In step 4, if the oil level Lo is less than the management level L (Lo<L), control proceeds to step 5, where oil is supplied to the oil pan 3, and control again returns to step 2. If the oil level Lo is greater than the management level L (Lo>L), control proceeds to step 6 where the oil is removed from the oil pan 3 and control again returns to step 2. If the oil level Lo is at the management level L (Lo=L), control proceeds to step 3.

In this way, the oil level in the oil pan 3 is kept at the management level by supplying and removing oil depending on the oil level.

In step 4 and step 3 following step 1, control is carried out to continuously supply a predetermined quantity of new oil from the reserve tank 4 to the oil pan 3.

In step 7, it is judged if the system has stopped, that is to say if engine operation has been terminated. If the system has stopped, control is terminated, while if the system has not stopped, control again returns to step 1 and the above-mentioned flow is repeated.

With the method and apparatus for replenishing the lubricating oil of an internal combustion engine, since it involves, during operation of the engine, continuously supplying a predetermined quantity of new oil from the reserve tank 4 to the oil pan 3, and checking the oil level in the oil pan 3 at fixed periods, and supplying or removing oil to bring the oil level to the management level, then it has the following advantages over the conventional technology.

(1) If the engine oil in the reserve tank 4 is managed, then it is not necessary to periodically change the engine oil in the oil pan 3, so that oil maintenance can be greatly reduced, and particularly with stationary type gasoline engines or diesel engines, the large amount of time and labour required in lubricating oil replenishment can be reduced enabling a reduction in running costs.

(2) It is not necessary to increase the capacity of the oil pan 3.

(3) Not only can the oil consumed portion be replaced, but since during engine operation, oil is continuously supplied to the oil pan 3, then the life of the oil can be greatly extended, and in particular the load on the filter to remove insoluble matter in the oil can be significantly reduced.

(4) During engine operation, since a predetermined quantity of new oil is continuously supplied from the reserve tank 4 to the oil pan 3, then there is not the requirement, as with the conventional technology, to replace a large quantity of oil at one time. Moreover since the oil replenishment quantity can be closely controlled, there is not the wastage of large quantities of oil wherein the additives in the oil are still able to function adequately. Therefore, since the additives in the oil can still function effectively, an adequate effective extension of the life of the lubricating oil can be achieved, so that oil wastage is minimized.

(5) Since the oil level in the oil pan 3 is checked at fixed periods, and oil is supplied or removed to bring the oil level to the management level, then any inappropriateness in the oil level due to the relation between the oil supply quantity and the consumption quantity can be prevented, so that the oil level can be always maintained at the appropriate oil level.

In the above embodiment, the construction is such that, during engine operation, a fixed quantity of new oil is continuously supplied from the reserve tank 4 to the oil pan 3. However it is possible to change the oil supply quantity to correspond to the loading conditions on the oil.

In this case, since the load on the oil changes with the engine operating conditions, then the oil supply quantity is made a quantity previously determined to correspond to the engine operating conditions.

Engine operating conditions which produce a load on the oil are determined from the engine rotational speed, oil temperature, intake passage boost pressure and engine operating time. Devices to detect these are provided, so that a control device incorporated into the control unit 11 can control the lubricating oil quantity for supply to the oil pan 3 to a quantity corresponding to the engine operating conditions (engine rotational speed, oil temperature, intake passage boost pressure, and engine operating time), based on detection signals output from the respective detection devices. This control may be carried out continuously corresponding to changes in engine operating conditions, or may be carried out intermittently.

With such a construction, the effect of changing the oil supply quantity corresponding to the loading conditions on the oil enables an even greater effective extension of the life of the oil.

Moreover, the arrangement may be such that when the oil level in the oil pan 3 falls below the lower limit level (lower level) or rises above the upper limit level (upper level), the oil is respectively supplied or removed to bring the oil level to the management level. This arrangement may be used jointly with the method of supplying or removing the oil at fixed periods to bring the oil level to the management level.

With the abovementioned embodiment, an example wherein the oil pan 3 is used as the lubricating oil holding region has been described. However a construction is also possible involving a sub-tank in which the engine oil is stored, provided separately from the oil pan 3, and during engine operation, a predetermined quantity of new oil is continuously supplied from the reserve tank 4 to this sub-tank.

We claim:

1. A method of replenishing lubricating oil in an internal combustion engine, comprising the step of continuously supplying, without interruption during operation of the engine, a predetermined quantity of new oil from a reserve tank in which lubricating oil is stored to a holding region for lubricating oil circulated to the engine.

2. The method of replenishing lubricating oil in an internal combustion engine according to claim 1, further comprising the steps of periodically determining the level of the lubricating oil in the lubricating oil holding region and performing one of the substeps of supplying the lubricating oil to the oil holding region and removing the lubricating oil from the oil holding region so that the lubricating oil level in the oil holding region is maintained at a management level.

3. The method of replenishing lubricating oil in an internal combustion engine according to claim 2, wherein the substep of supplying the lubricating oil to the oil holding region is performed when the lubricating oil level in the lubricating oil holding region falls below a predetermined lower limit and wherein the substep of removing the lubricating oil from the oil holding region is performed when the lubricating oil level in the lubricating oil holding region rises above a predetermined upper limit level.

4. The method of replenishing lubricating oil in an internal combustion engine according to claim 1, wherein the predetermined quantity of new oil supplied to the holding region in the supplying step corresponds to engine operating conditions.

5. An apparatus for replenishing lubricating oil in an internal combustion engine, comprising:

a reserve tank for storing lubricating oil;

lubricating oil supply means for supplying a predetermined quantity of lubricating oil from said reserve tank to a holding region for lubricating oil circulated to the engine; and control means for controlling, during operation of the engine, said lubricating oil supply means so that a predetermined quantity of new oil is continuously supplied, without interruption, from said reserve tank to said lubricating oil holding region.

6. The apparatus for replenishing lubricating oil in an internal combustion engine according to claim 5, further comprising lubricating oil removal means for removing the lubricating oil from said lubricating oil holding region, and oil quantity detection means for periodically detecting the quantity of oil in said lubricating oil holding region, said control means controlling, during operation of the engine, said lubricating oil supply means and said lubricating oil removal means, based on the engine oil quantity determined periodically by said oil quantity detection means.

7. The apparatus for replenishing lubricating oil in an internal combustion engine according to claim 5, further comprising an engine operating conditions detector for detecting engine operating conditions, said control means controlling the quantity of lubricating oil supplied to said lubricating oil holding region according to the engine operating conditions detected by said engine operating conditions detector.

8. The method of replenishing lubricating oil in an internal combustion engine according to claim 1, wherein an oil pan of the engine forms the holding region for the lubricating oil.

9. The apparatus for replenishing lubricating oil in an internal combustion engine according to claim 5, wherein an oil pan of the engine forms the holding region for the lubricating oil.

* * * * *